Figure 1:
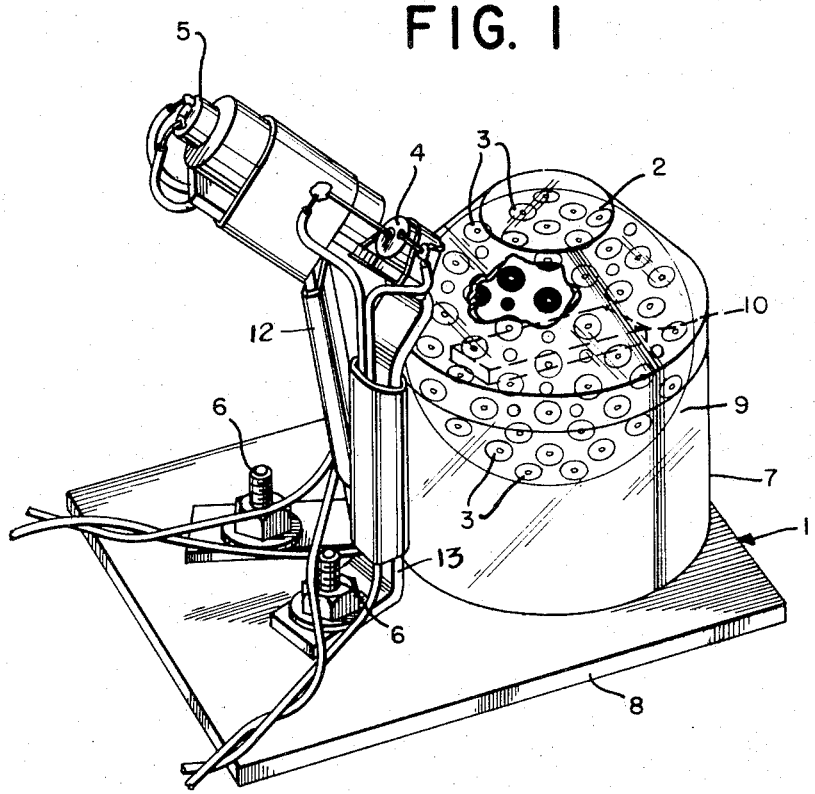

United States Patent

[11] 3,633,039

| [72] | Inventors | Martin Herbstman<br>Forest Hills;<br>William Yarina, Whitestone, both of N.Y. |
|------|-----------|---|
| [21] | Appl. No. | 839,408 |
| [22] | Filed | July 7, 1969 |
| [45] | Patented | Jan. 4, 1972 |
| [73] | Assignee | Maxson Electronics Corporation<br>Great River, N.Y. |

[54] DISTURBANCE-SENSING DEVICE
7 Claims, 2 Drawing Figs.

[52] U.S. Cl..................................................... 250/231,
250/222, 340/421
[51] Int. Cl............................................................ G01d 5/34
[50] Field of Search........................................ 250/221,
222, 231, 231 GY, 203, 206; 356/247; 340/421;
74/5.6

[56] References Cited
UNITED STATES PATENTS

| 1,929,400 | 10/1933 | Shulte | 250/231 X |
| 2,364,908 | 12/1944 | Miller | 250/203 X |
| 2,713,134 | 7/1955 | Eckweiler, Jr. | 250/203 X |
| 2,885,565 | 5/1959 | Davis | 250/231 |
| 3,270,567 | 9/1966 | Crampton | 74/5.6 |
| 3,391,840 | 7/1968 | King | 250/206 X |

*Primary Examiner*—Walter Stolwein
*Attorney*—Bernard Malina

ABSTRACT: The device comprises a liquid-floated plastic ball in which a magnetic compass is embedded. The external surface of the ball is marked with a plurality of small black dots. A narrow light beam is directed to the marked surface and the light reflected therefrom is detected by a photoelectric sensor. The variations in the intensity of the reflected light which are caused by the motion of the ball are converted by the photoelectric sensor into an electric signal which triggers a control or alarm circuit.

INVENTORS
MARTIN HERBSTMAN
WILLIAM YARINA

BY Nolte & Nolte

ATTORNEYS

DISTURBANCE-SENSING DEVICE

The present invention relates to devices for sensing disturbances. In particular, the present invention relates to a device for sensing either a disturbance in the local magnetic field or an angular displacement between a disturbed member and a liquid-floated magnetic compass.

In conventional liquid-floated compass units, it is necessary to adjust the position of the compass unit at its emplacement and the indication is limited to a single plane only. Furthermore such known devices in their response, do not sufficiently discriminate between the magnitude of disturbances.

It is a primary object of the present invention to provide a disturbance-sensing device which avoids the disadvantages of the prior art.

More particularly, it is an object of the present invention to provide a disturbance-sensing device which is omnidirectional and will operate in any spatial position irrespective of its orientation.

It is also an object of the present invention to provide a device of the above type which will be responsive to any disturbances to a local earth's magnetic field, such as those caused by the introduction or withdrawal of ferrous material.

Another object of this invention is to provide a tamper-proof device which will release a warning signal if moved.

A further object of this invention is to make the above device insensitive to disturbances which do not exceed a threshold magnitude.

According to a primary feature of the present invention, a permanent magnet is embedded in a liquid-floated plastic ball. The external preferably opaque white surface of the ball is marked with a series of evenly distributed black spots. The liquid is disposed within a hollow preferably spherical container made of transparent plastic. Attached to the outside transparent housing is a photoelectric sensing system which transmits a light beam on the ball surface and senses the reflected light to trigger an electronic alarm circuit. By adjusting the position of the magnet within the ball, gravitational and magnetic forces are combined either to produce a stabilized equilibrium of the ball or to make the ball more sensitive to a selected one of these two forces.

Figure 2:
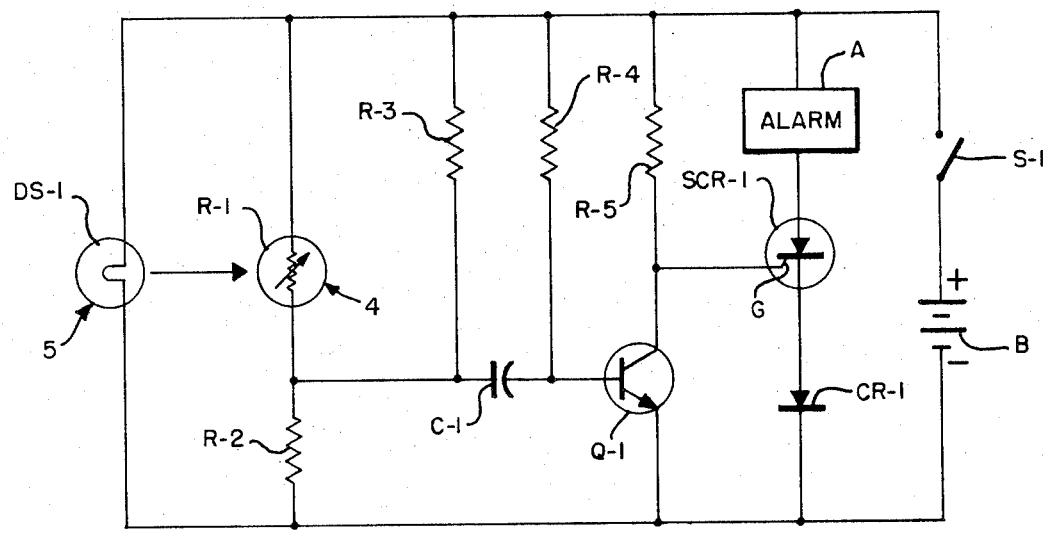

The basic design and operation of the disturbance-sensing device according to this invention will now be described by way of an example in connection with the accompanying drawing, wherein FIG. 1 is a perspective view of the mechanical part of the device; and FIG. 2 is a schematic diagram of electrical trigger circuit for actuating the alarm system.

Referring to the drawings and in particular to FIG. 1 thereof, the disturbance-sensing device of the present invention comprises a spherical ball 2, preferably made of plastic and freely floated in a transparent liquid 9 contained in a container housing 7 of transparent plastic.

The exterior of container housing 7 is cylindrical at its base and is frustoconical at its upper end. A substantially spherical hollow 11 extends through the frustoconical upper end and a portion of the cylindrical base portion. Spherical hollow 11 is suitably dimensioned to accommodate ball 2 freely floated in transparent liquid 9. Container housing 7 is fixedly mounted at its base portion to the top surface of support platform 8.

Within the ball 2, a bar 10 of permanent magnetic material is embedded below the geometric center of the ball, causing ball 2 it to stabilize in the vertical plane in the manner of a pendulous mass thereby enabling the detector or pickup 4 to detect any tilting movement on housing 7 responsive to the housing's being tilted from the vertical plane. The reaction to such a tilt will be for the ball 2 to remain vertically stabilized like a pendulous mass while housing 7 moves, with respect to the stabilized ball 2, resulting in a sequence of sensing steps as will be described below.

The external opaque white surface of ball 2 is marked with a series of uniformly distributed black spots 3. Due to its floating condition and the presence of bar magnet 10, ball 2 will orient itself in such a way that bar magnet 10 will be aligned in the magnetic North-South direction. In order to detect relative motion between ball 2 and container housing 7, the disturbance-sensing device of the present invention includes a source of directional light for illuminating a small area on the dotted surface of ball 2 and means for detecting the light reflected therefrom. The illuminating means comprises a lamp and lens assembly 5 which projects a beam of light through transparent housing 7 and transparent liquid 9 and onto the external opaque surface of ball 2 to produce a reflected light beam.

Lamp and lens assembly 5 is suitably oriented and fixedly secured to platform 8 by means of a mounting bracket 12 and nut and bolt assembly 6 closely spaced from the outer surface of container housing 7. A photoelectric sensor 4 similarly fixedly mounted on platform 8 by means of a mounting bracket 13 and nut and bolt assembly 6, with detector 4 being suitably positioned so that the photosensitive element R-1 (shown schematically in FIG. 2) is optically aligned with the reflected light beam from the surface of ball 2. In case of horizontal movement as the housing 7 is rotated in the horizontal plane, ball 2 will tend to remain stabilized in the North-South direction. The area of illumination on the ball surface produced by lamp 5 will then be swept over the surface of the ball alternately passing over black spots, light areas, etc. The photoelectric sensor will sense the variations in reflected light intensity during such an excursion, producing a corresponding variation in the conductivity of the photosensitive element R-1. Photosensitive element R-1 is part of a trigger circuit shown in FIG. 2, and when the magnitude of the foregoing variations in the conductivity of element R-1 produce a voltage variation which exceeds a predetermined threshold level, the trigger circuit of FIG. 2 is operative to actuate an alarm indicating that the position of housing 7 has been disturbed or that a disturbance has occurred in the magnetic field in which ball 2 lies.

By virtue of the placement of the center of gravity of ball 2 below its geometric center by placing bar magnet 10 below the geometric center of ball 2, and the rotation-free suspension of ball 2 in liquid 9, ball 2 is hereby stabilized in the vertical direction because of the behavior of ball 2 as a pendulous mass due to the action of gravity. Furthermore, ball 2 is stabilized in the horizontal plane by the action of the earth's magnetic field on bar magnet 10, thereby resulting in an omnidirectional disturbance-sensing system.

Due to the distribution of annular or circular black spots over the entire surface of the ball, the present disturbance-sensing system requires no calibrations at emplacement and can be placed in any position throughout the 360° orientation of all three coordinates.

Referring now to FIG. 2, there is shown an electronic trigger circuit which is actuated by the output signal of a photoelectric system 4 and 5. The system is designed so that change in orientation of tilts up to a predetermined angle, for example 2°, will not result in a trigger circuit output. Therefore, vibrations, nearby shocks, wind loads, noise, etc., which do not produce an output voltage signal greater than a predetermined minimum voltage level resulting from the change in light intensity of the reflected light, will not falsely trigger the alarm unit.

The circuit is designed to react to excursions beyond this angle of 2° irrespective of the rate of change of angular displacement of ball 2, but simply in response to orientation or tilt displacement. Even if the housing 7 is rotated at a substantially constant rate, the trigger circuit will be actuated by the action of the spot of light traversing contrasting areas on the surface of the ball.

The photoelectric sensing device 4 and 5 comprises a lamp DS1 and photoelectric detector or sensor in the form of photoresistor R-1. Photoresistor R-1 is connected in parallel with resistor R3 of a voltage divider R2, R3 and further connected to the base of transistor Q1 via coupling condenser C1. The emitter of Q1 is grounded and the collector thereof is coupled to the DC power source B through working resistor R5. Resistor R4 connects power source B with the base of Q1, and has a resistance value so as to produce such a base current in transistor Q1 as to saturate the transistor Q1. Due to the saturated condition, the collector of Q1 is approximately at zero voltage. Gate G of silicon-controlled rectifier SCR-1 is directly connected to the collector of Q1. The anode of SCR-1 is coupled to the power source B through an alarm circuit A and the cathode thereof is grounded through rectifier CR1.

In operation, after emplacement of the housing 7, sufficient time should be allowed for the ball 2 to stabilize before energizing the trigger circuit by turning on the Switch S1.

Should the housing 7 be moved, the light intensity of light impinging on photoresistor R1 will change, either decreasing immediately or first increasing and then decreasing. When the light intensity decreases, the resistance of the photoresistor increases causing a drop in the voltage at the junction point of R1, R2, R3 and C1. This voltage drop is applied through condenser C1 to the base of transistor Q1 and by reducing the base current, it displaced the working point of transistor Q1 out of saturation. The resulting voltage increase on the collector of Q1 is applied to the gate of the silicon-controlled rectifier SCR-1, causing it to avalanche, thus allowing full current flow through the alarm device A and actuating the same.

For detection of magnetic influence, the center of gravity of the ball 2 with magnet 10, is located at or near its geometric center. When the device is placed at its position, the ball will orient itself, in alignment with the North-South direction as described before. Due to the absence of the pendulous mass effect producing vertical stabilization characteristic of the previously described embodiment of the present invention the ball is now free to move in both the horizontal and vertical planes: magnet 10 will be oriented with the earth's magnetic field, resolving the local horizontal and vertical components of the total earth's magnetic field.

Thereafter, any disturbance to the local earth's magnetic field, such as that caused by the approach of a ferromagnetic body, will cause the ball to reorient along the modified lines of flux.

Reorientation of the ball 2 will respect to the fixed position of housing 7 will cause the black and white areas to move in front of the light beam from lamp 5. This action will result in variations of the reflected light detected by the photoelectric sensor, causing the trigger circuit alarm to operate as previously described.

While, of course, the arrangement of the invention, in which the center of gravity of the plastic ball is below its geometric center, is also responsive to factors influencing the magnetic field, due to the pendulum mass effect, this arrangement is influenced primarily only by horizontal deviations in the magnetic field and not declination i.e. vertical deviations of the field. The device with the lower center of gravity is thus useful primarily in applications where detection of movement of the housing with respect to a stationary ball are desired. When the center of gravity is at the geometric center, however, the device can be employed either to detect movement of the housing or magnetic influence, since it is responsive to all components of the magnetic field, although it is slightly less sensitive to disturbance than the former arrangement when employed to detect housing movements.

While the invention has been described with respect to a device having an opaque white ball with black spots, it will be apparent that any selection of background and spot color or shape is permissible as long as the two areas are sufficiently contrasting with respect to reflection of the light. For example, in another embodiment contrasting zigzag lines can be employed instead of spots. Similarly, the invention is not limited to the use of a plastic ball, and any material may thus be employed for the ball as long as it is floatable in the liquid. In addition, it is not necessary that the complete housing be transparent, as long as the area through which the light passes is transparent. An additional modification uses a radioactive material enclosed within a transparent, phosphor-coated ball.

The ball painted with an opaque material and opening in the paint are scraped, thereby exposing the luminescent phosphor to view through the openings. This obviates the need for the light source and the lens. The remainder of the system operates the same way. In addition, the effect of a center of gravity below the geometric center of the ball may be obviously obtained by the use of weights instead of the position of the magnet.

What is claimed is:

1. A disturbance-sensing device comprising a transparent fluid contained in an opaque housing having a transparent portion, a transparent spherical body within said housing and freely floating in said liquid, compass magnet means affixed to said body to stabilize said body in the horizontal plane by the earth's magnetic field, the inside surface of said spherical body being coated with a luminescent material and the outside surface thereof being provided with opaque areas, photoresponsive means positioned to receive luminescent light passing through transparent areas of said spherical body, said fluid and said transparent portion, and trigger means connected to said photosensitive means and responsive to a predetermined output level of the latter.

2. A disturbance-sensing device comprising a fluid-floated spherical body having a background surface area and a plurality of marked areas optically contrasting with and distributed over said background area, a housing having a transparent cavity containing a transparent fluid floating said spherical body, magnet means affixed to said spherical body to stabilize said body in the horizontal plane by the earth's magnetic field, a light source operative to direct a beam of light to said spherical body to illuminate at least a portion of said body surface, photosensitive means in optical alignment with said spherical body, said light source, photosensitive means and housing being in fixed positional relationship, said photosensitive means being operative to sense the variation of intensity of light reflected from a preselected area on the surface of said body produced by the relative motion of said spherical body with respect to said photosensitive means and to produce a detection signal in accordance with the reflected light intensity variation, said magnet means comprising a bar magnet positioned within said body such that the center of gravity of said bar magnet and the center of gravity of said body without said bar magnet within are spaced apart to thereby impart a pendulous mass effect to said body and stabilize said body in the vertical plane whereby said body is stabilized in both the horizontal and vertical planes to enable said disturbance-sensing device to detect relative motion of said housing and said mass.

3. A disturbance-sensing device comprising a fluid-floated spherical body having a background surface area and a plurality of marked areas optically contrasting with and distributed over said background area, a housing having a transparent cavity containing a transparent fluid floating said spherical body, magnet means affixed to said spherical body to stabilize said body in the horizontal plane by the earth's magnetic field, a light source operative to direct a beam of light to said spherical body to illuminate at least a portion of said body surface, photosensitive means in optical alignment with said spherical body, said light source, photosensitive means and housing being in fixed positional relationship, said photosensitive means being operative to sense the variation of intensity of light reflected from a preselected area on the surface of said body produced by the relative motion of said spherical body with respect to said photosensitive means and to produce a detection signal in accordance with the reflected light intensity variation, said bar magnet being positioned within said body such that the center of gravity of said bar magnet and the center of gravity of said body without said bar magnet within are substantially coincidental, whereby said disturbance-sensing device is operative as an omnidirectional magnetic influence detector.

4. A disturbance-sensing device comprising a fluid-floated spherical body having a background surface area and a plurality of marked areas optically contrasting with and distributed over said background area, magnet means affixed to said spherical body to stabilize said body in the horizontal plane by the earth's magnetic field, a light source for illuminating at least a portion of said body surface, photosensitive means in optical alignment with said spherical body and operative to sense the variation of intensity of light reflected from a preselected area on the surface of said body produced by the relative motion of said spherical body with respect to said photosensitive means and to produce a detection signal in accordance with the reflected light intensity variation, and trigger means connected to said photosensitive means and operative in response to said detection signal to produce an alarm signal when said detection signal exceeds a predetermined level.

5. A disturbance-sensing device as defined in claim 4 wherein said photosensitive means comprises photoelectric means operative to produce an electrical signal output in response to the illumination thereof by a light source and wherein said trigger means comprises an electrical amplifier to employ said photoelectric output signal.

6. A disturbance-sensing device as defined in claim 5 wherein said photoelectric means comprises a photoresistor.

7. A disturbance sensing device as defined in claim 6 wherein said trigger means includes an electrically actuated alarm and wherein said electrical circuit comprises gating means operative to electrically energize said alarm when the output of said electrical amplifier exceeds a predetermined level.

\* \* \* \* \*